United States Patent
Sasaki et al.

(10) Patent No.: US 6,325,544 B1
(45) Date of Patent: Dec. 4, 2001

(54) SPHERICAL BEARING (75) Inventors: Gen Sasaki; Shinichi Akao; Kennosuke Kariya, all of Kitasaku-gun (JP)

(73) Assignee: Minebea Co., Ltd., Nagano-ken (JP)

( * ) Notice: Subject to any disclaimer, the term of this patent is extended or adjusted under 35 U.S.C. 154(b) by 0 days.

(21) Appl. No.: 09/629,097

(22) Filed: Jul. 31, 2000

(30) Foreign Application Priority Data

Jan. 5, 2000 (JP) .................................................. 12-000350

(51) Int. Cl.[7] ....................................................... F16C 23/04
(52) U.S. Cl. ............................. 384/192; 384/209; 384/210
(58) Field of Search ................................... 384/192, 203, 384/206, 208, 209, 210

(56) References Cited

U.S. PATENT DOCUMENTS

| 2,766,079 | 10/1956 | Browne . | |
|---|---|---|---|
| 3,516,136 | * 6/1970 | Carter | 384/203 X |
| 3,697,145 | * 10/1972 | Day, Jr. | 384/208 |
| 4,076,343 | * 2/1978 | McCloskey | 384/210 |
| 5,718,517 | * 2/1998 | Morando | 384/192 |
| 6,004,037 | * 12/1999 | Harris et al. | 384/206 |

FOREIGN PATENT DOCUMENTS

| 1513956 | 2/1968 | (FR) . |
|---|---|---|
| 1565082 | 4/1969 | (FR) . |
| 2 674 583 A1 | 10/1992 | (FR) . |

* cited by examiner

Primary Examiner—Thomas R. Hannon
(74) Attorney, Agent, or Firm—Oliff & Berridge, PLC (57) ABSTRACT On one side of the race retention hole 2, a screw portion 3 is formed, and on one side of the periphery surface of the outer race 4 an outer conical portion 5 is formed, and with the race retention hole 2, the periphery surface of the outer race 4 supporting the spherical surface 9a of the outer race 9 is retained, the stopping screw 8 is formed on with the inner conical portion 7 to be fit with the periphery surface 5a of the outer conical portion 5 is screwed in the screw portion 3 and tightened. Thus, by tightening the stopping screw 8, the periphery surface 5a of the outer conical portion 5 is pressed with the inner circumference 7a of the inner conical portion 7 and the contact surface pressure between the inner circumference surface 4b of the outer race 4 and the spherical surface 9a of the inner race 9 is increased, so that by regulating the tightening force of the stopping screw 8 the sliding torque of the spherical bearing is easily adjusted.

2 Claims, 11 Drawing Sheets

SPHERICAL BEARING

BACKGROUND OF THE INVENTION

1. Field of the Invention

The present invention relates to a spherical bearing, in particular, a torque adjusting mechanism in which a sliding torque of a spherical bearing is adjusted on an inner circumference of an outer race by regulating a pressing force against a spherical surface of the inner race.

2. Conventional Art

Figure 10:
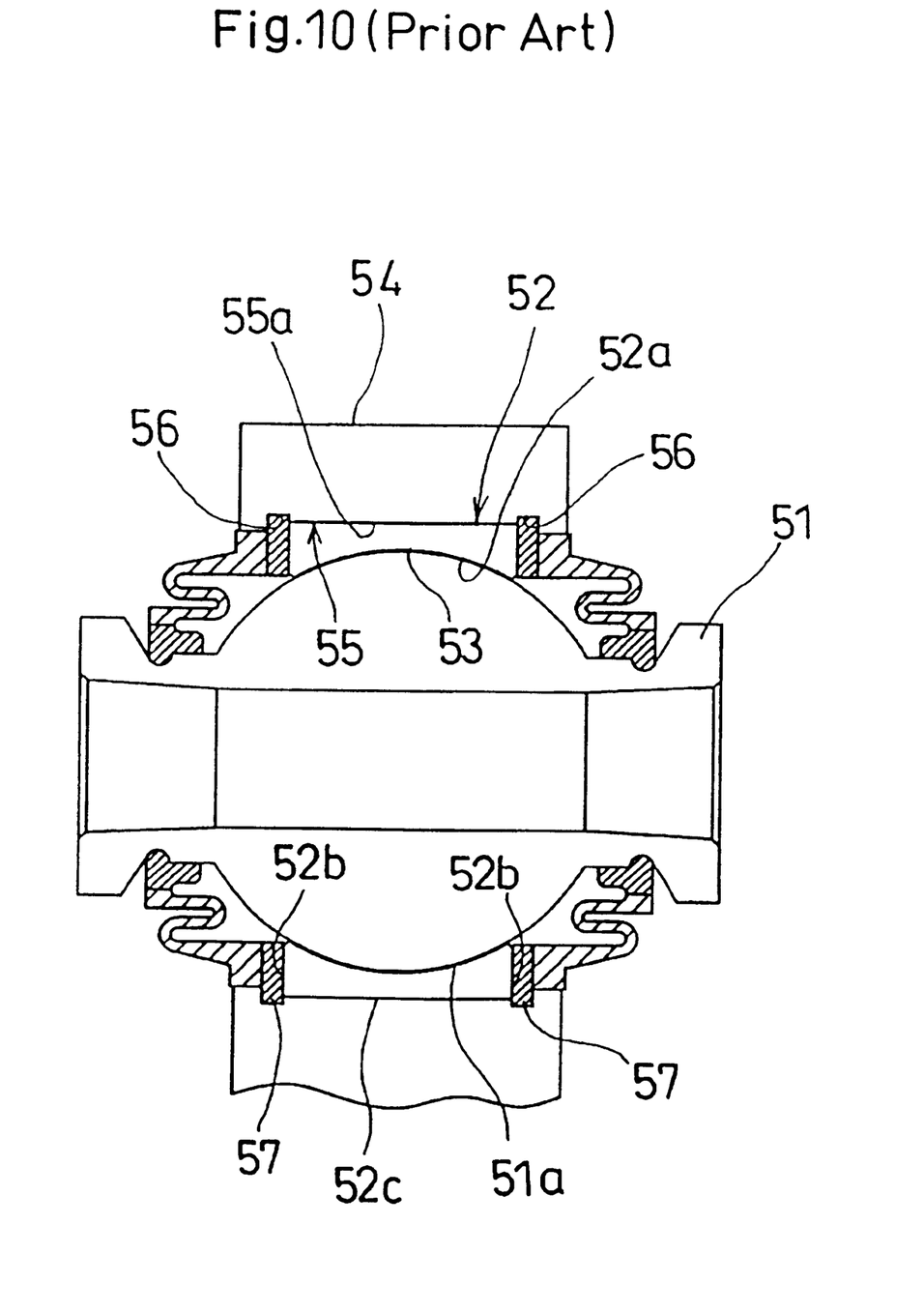
FIG. 10 is a sectional view of a conventional spherical bearing.
Figure 11:
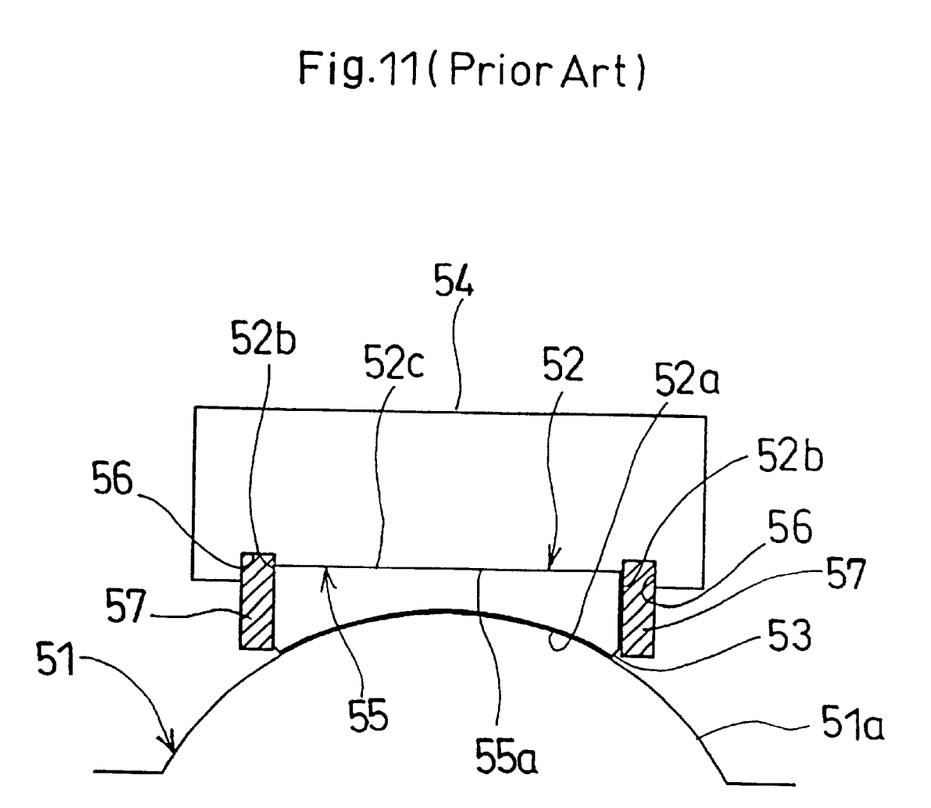
FIG. 11 is for explaining partially enlarged sectional view of the conventional spherical bearing.

In general, in a spherical bearing, as shown in FIGS. 10, 11, an inner race 51 formed with a spherical surface 51a is supported rotatably and slidably by an outer race 52 on the inner circumference 52a which is covered with a sliding liner 53, and the outer race 52 is retained into a race retention hole 55 formed on a housing 54 and installed in the housing 54 by making end faces 52b of the outer race 52 engaged with a pair of snap rings 57 retained in annular grooves 56 provided at a given spacing on the inner wall surface 55a of the race retention hole 55.

In such a spherical bearing, the sliding torque was adjusted by regulating the fitting state between the inner wall surface 55a of the race fitting hole 55 and periphery surface 52c of the outer race 52 and changing a contact surface pressure between the inner circumference 52a of the outer race 52 and the spherical surface 51a of the inner race 51. Further, it has been practiced that, by forming, in an assembly of the outer race 52 and the inner race 51, in advance, the sliding torque between the outer race 52 and the inner race 51 to be larger and releasing a remaining stress of the outer race 52 by a specific releasing machine (not shown) to regulate the contact surface pressure between the inner circumference surface 52a and the spherical 51a of the inner race 51 and to regulate the sliding torque of the assembly to a desired value.

However, in the conventional spherical bearing torque adjusting mechanism by fitting the inner wall surface 55a of the race retention hole 55 and the periphery surface 52c of the outer race 52, since the working precision of the race retention hole 55 and outer race 52 becomes varied, the contact surface pressure between the inner circumference surface 52a of the outer race 52 and the spherical surface 51a of the inner race 51 does not become constant, so that it is difficult to obtain a stable sliding torque. Further, the following problems have been brought out; in the torque adjusting mechanism of the spherical bearing to adjust the sliding torque by releasing the residual stress of the outer race 52 with a specific releasing machine, although a given sliding torque can be obtained, an exclusive releasing machine becomes necessary, and since the number of process due to the releasing machine is increased, costs increase greatly, and further an extra space for a releasing machine becomes necessary in a factory. In addition, once releasing the sliding torque with the releasing machine, it is impossible to make the sliding torque recovered, in addition, if the sliding torque is too much released, an expensive assembly has been wasted. Further, even in a spherical bearing, the sliding torque is appropriately adjusted, due to wearing of the sliding liner 53, the sliding torque is reduced, and in order to obtain an initial sliding torque, an expensive assembly has to be replaced.

Accordingly, the present invention has been made in the light of the above problems and it is the object of the present invention to provide a torque adjusting mechanism of the spherical sliding bearing, in which a constant sliding torque is easily obtained, and even if the sliding torque is reduced due to the wearing of the sliding liner, by re-adjusting, the sliding torque can be restored.

In order to attain the above object, according to a first aspect of the present invention, in a sliding torque adjusting mechanism of a spherical sliding bearing which is formed by fitting a spherical bearing made of an outer race and an inner race supported rotatably on the inner race circumference of the outer race with a race retention hole, into which the spherical bearing is retained, a screw portion is provided on one side of the inner wall of the race fitting hole with a given depth coaxially with the race retention hole, and on the other side of the race retention hole an annular groove to be fit with a first snap ring is formed, further, on one end of the periphery of the outer race, an outer conical surface of a given tapered angle is provided and a stopping screw engaged with the screw portion, which has a through hole in the axial direction, and on one end of the through hole, an inner conical surface which is fit with the outer conical surface is provided.

By thus constructed, while the stopping screw being engaged with the screw portion formed on one inner wall surface of the race retention hole, and by tightening the stopping screw with the inner surface of the inner conical surface of the periphery of the outer conical surface is pressed, so that a contact surface pressure between the inner surface of the outer race and the spherical surface of the inner race is regulated by regulating the tightening force of the stopping screw, as a result, the sliding torque of the spherical bearing can be adjusted.

Further, according to a second aspect of the present invention, on the inner wall of the through hole of the stopping screw, an annular groove is formed with which a second snap ring is retained.

By thus constructed, due to the tension of the second snap ring, the contact surface pressure between the stopping screw and the screw portion of the race retention hole can be increased to prevent the stopping screw from being loosened.

BRIEF DESCRIPTION OF THE DRAWING

FIG. 6 is for explanation of a tightening jig for a stopping screw of the embodiment of the spherical bearing, (a) is a front view and (b) is a plan view.

EMBODIMENT

Figure 1:
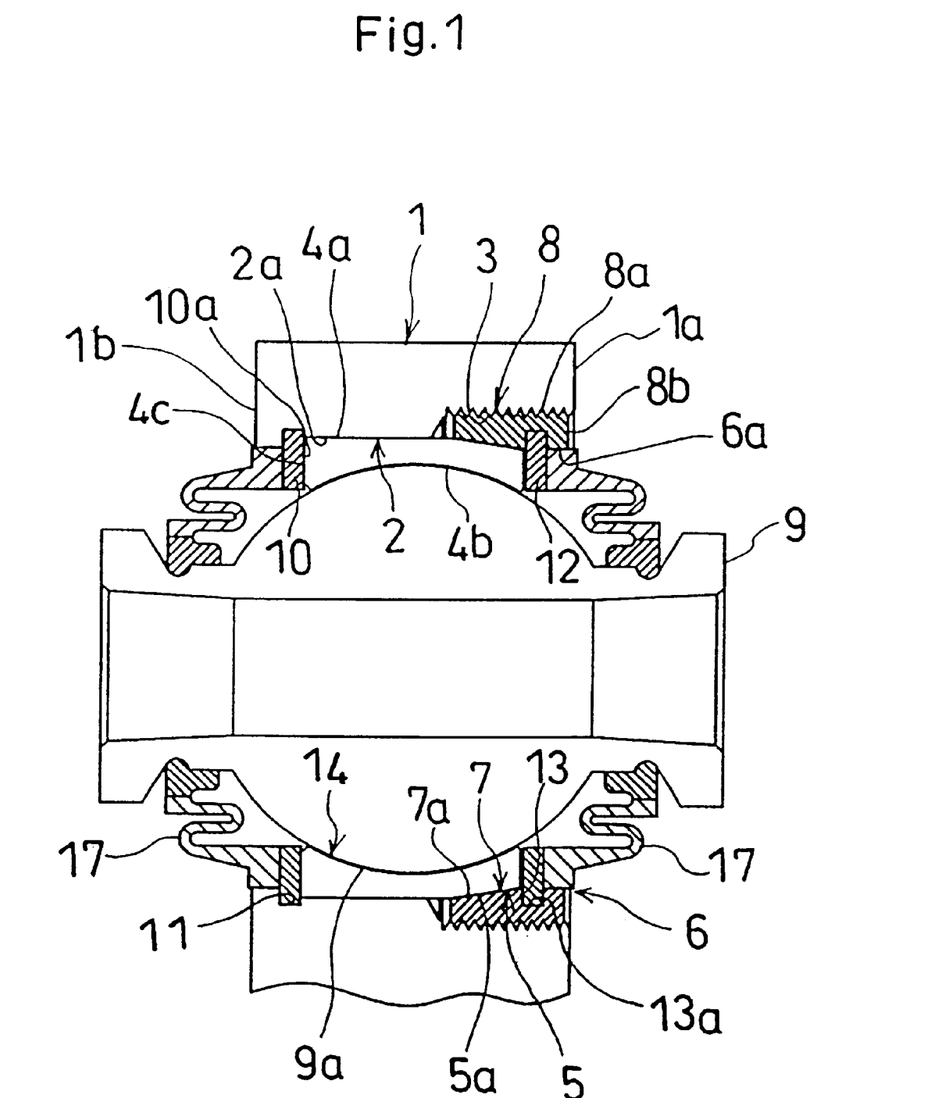
FIG. 1 is a sectional view of an embodiment of a spherical bearing.
Figure 2:
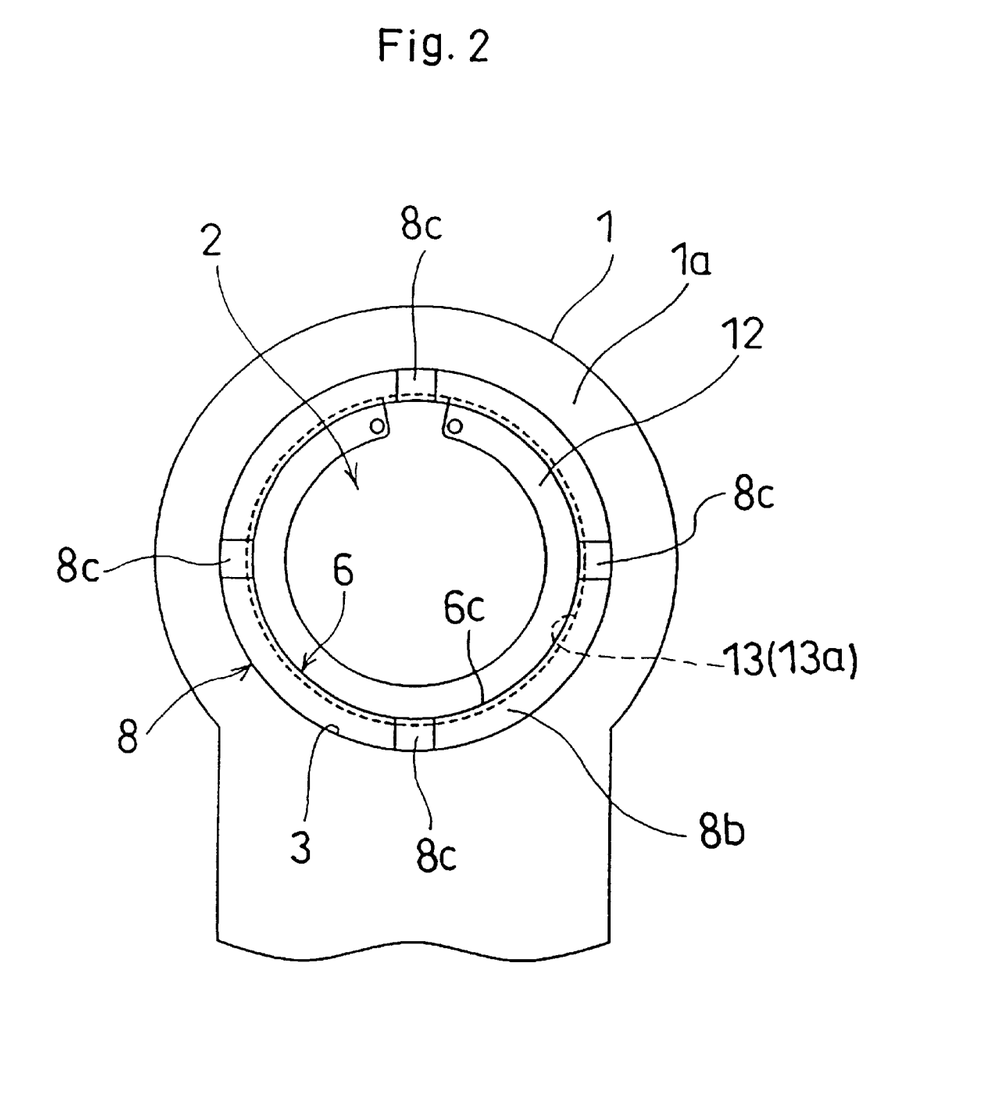
FIG. 2 is a front view of the embodiment of the spherical bearing.

Now, a torque adjusting mechanism of the spherical bearing of one embodiment of the spherical bearing of the present invention is explained based on FIGS. 1–7. In the torque adjusting mechanism of the present embodiment, as shown in FIG. 1, on one side of a race retention hole 2 formed in a housing 1 as a portion to be fixed, a screw portion 3 is provided coaxially with the race retention hole 2, on one side of the periphery 4a of the outer race 4, an outer conical portion 5 is formed. And, on the screw portion 3, a stopping screw 8, which comprises a through hole 6 being pierced in the axial direction, and in which, on one end of which an inner conical portion 7 which is fit with the outer conical portion 5 of the outer race 4 is provided, and the adjusting mechanism is adapted to regulate the torque adjusting mechanism of the spherical bearing by fitting the periphery surface 4a of the outer race 4 with the race retention hole 2 and tightening the stopping screw 8, the inner conical portion 7 of the stopping screw 8 fits with the outer conical portion 5 of the outer race 4, and further by regulating the tightening force of the stopping screw 8 to vary a contact surface pressure.

Next, a detailed explanation of the constitution of the torque adjusting mechanism of the spherical bearing is carried out.

Figure 3:
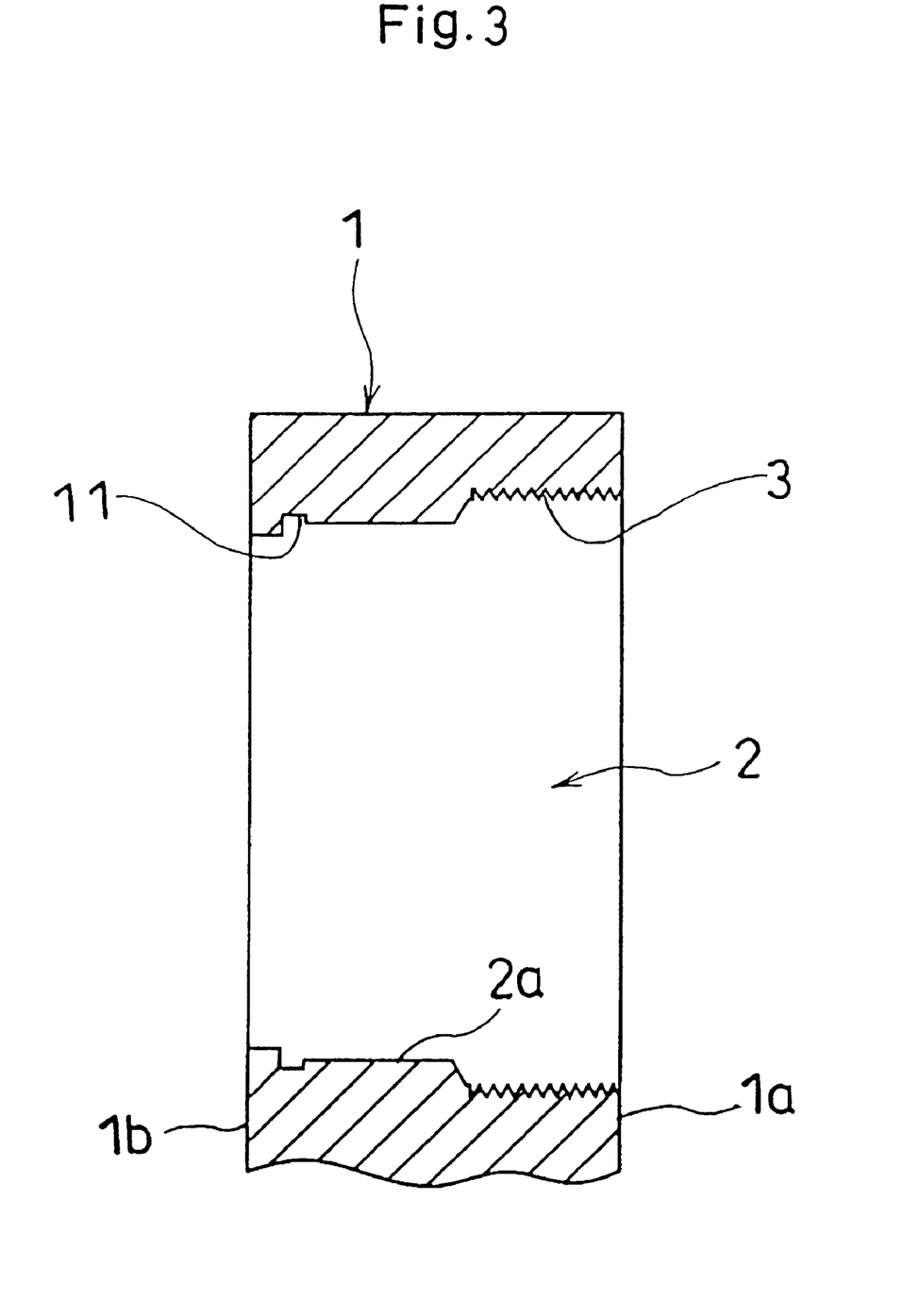
FIG. 3 is a sectional view of the embodiment of a housing for the spherical bearing.

First, as to the housing 1, on that housing 1 a pair of end faces 1a and 1b (see FIGS. 1 and 3) are formed in such a manner as those become normal to a not shown axis (hereinafter referred to as "axis") of a supported shaft and parallel with each other, and coaxially with the axis, and the race retention hole 2 which fits the periphery surface 4a of the outer race 4 at its intermediate portion is formed. Further, as shown in FIGS. 1 and 3, on one side of the inner wall 2a of the race retention hole 2, a screw portion 3 to be coaxially with the race retention hole 2, and have an outer diameter larger than the outer diameter of the race retention hole 2 is provided, and on the other side of the inner wall 2a of the race retention hole 2, an annular groove 11 for retaining the first snap ring 10 is formed.

Figure 4:
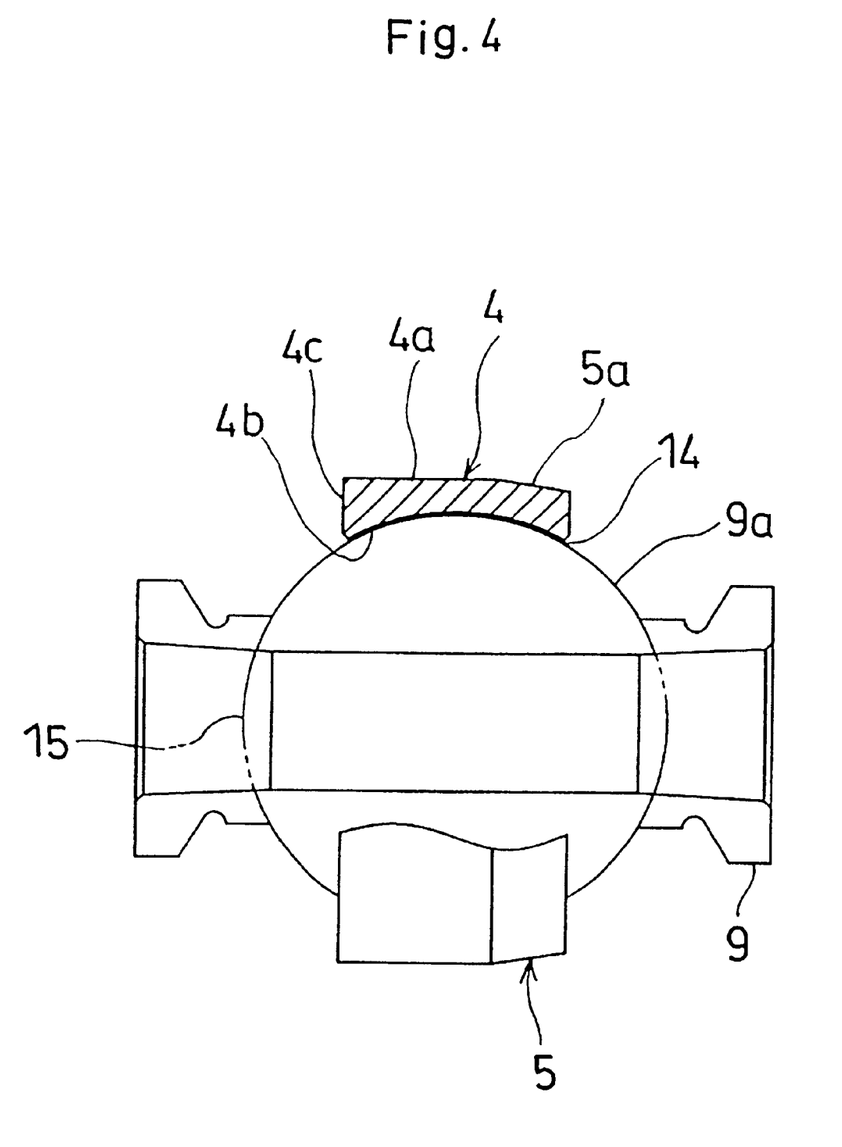
FIG. 4 is a sectional view of an assembly formed with an outer race and inner race of the embodiment of the spherical bearing.

Next, the outer race 4 is explained. The outer race 4 is, as shown in FIG. 4, formed in such a manner as the sectional view in a plane normal to the axis in the inner circumference surface 4b accords approximately with an arc having an circle 15 identical in diameters with the spherical surface 9a of the inner race 9, and is structured as it supports the spherical surface 9a of the inner race 9 rotatably and slidably. Further, on one side of the periphery surface 4a of the outer race 4, as shown in FIGS. 1 and 4, an outer conical portion 5 having a given tapered angle is formed. For reference, on the inner circumference surface 4b, a sliding liner 14 made of a polytetrafluoroethylene is covered.

Figure 5:
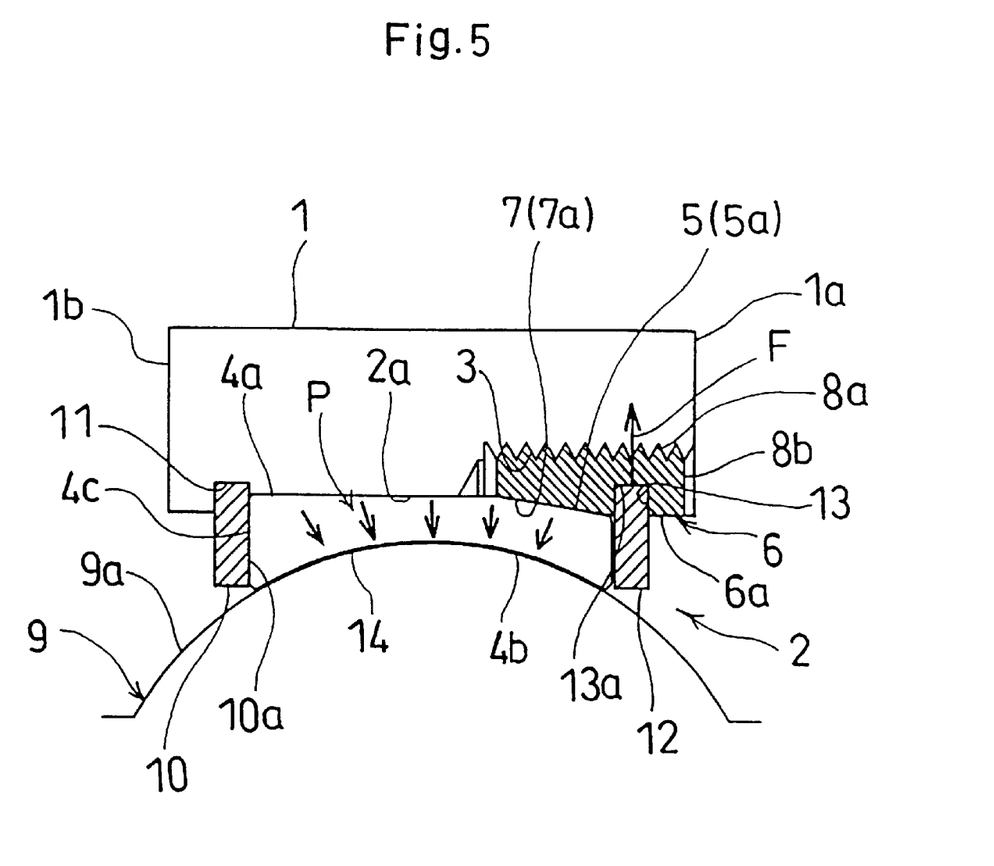
FIG. 5 is an enlarged view of one portion of the sectional view of the spherical bearing of the embodiment for explanation.
Figure 6A:
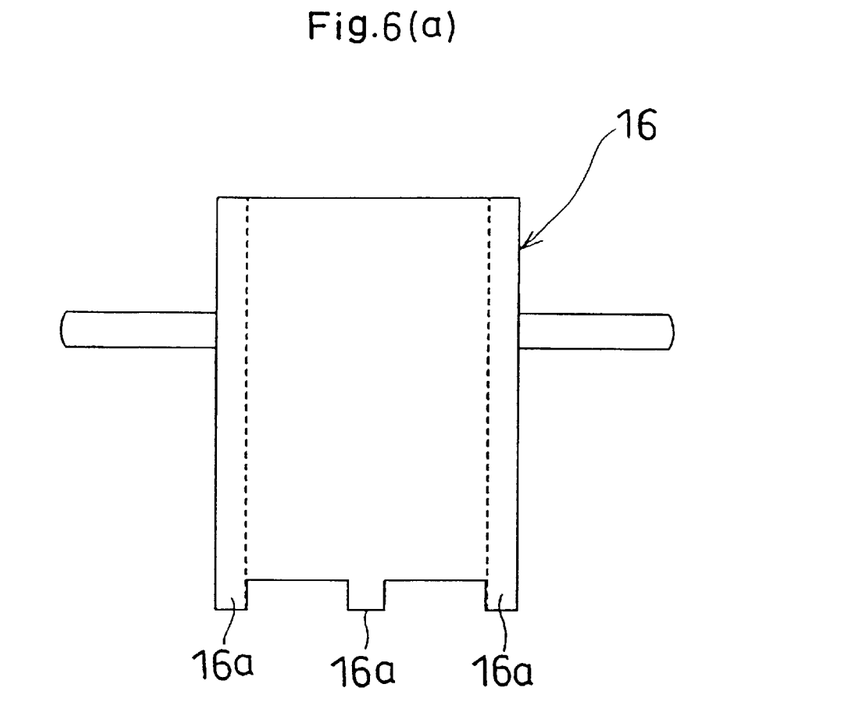
Figure 6B:
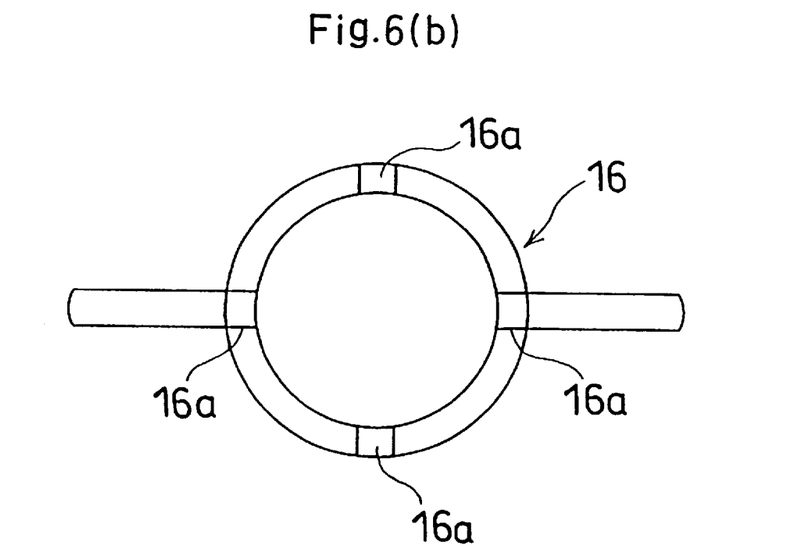

Next, the stopping screw 8 is explained. The stopping screw 8 is, as shown in FIG. 1, provided on its periphery surface with a screw 8a to screw in the screw portion 8 formed in the race retention hole 2, and a through hole 6 in which an inner conical portion 7 is formed to be fit with the outer conical portion 5 of the outer race 4. And, the spherical bearing of the embodiment of the present invention is adapted to be structured so as to generate a sliding torque by screwing the stopping screw 8 into the screw portion 3 and tightening the stopping screw 8 to press the inner circumference surface 7a of the inner conical portion 7 against the periphery surface 5a of the outer conical portion 5. Further, on the other side of the inner wall surface 6a of the through hole 6, as shown in FIGS. 1 and 5, an annular groove 13 for retaining the second snap ring 12 is formed. For reference, the stopping screw 8 is, as shown in FIG. 6, tightened with an exclusive tightening jig 16, for that purpose, the rear end face 8b of the stopping screw 8 is provided with a recessed portion 8c in which the projection 16a formed in the tightening jig 16 is to be fit.

Figure 8:
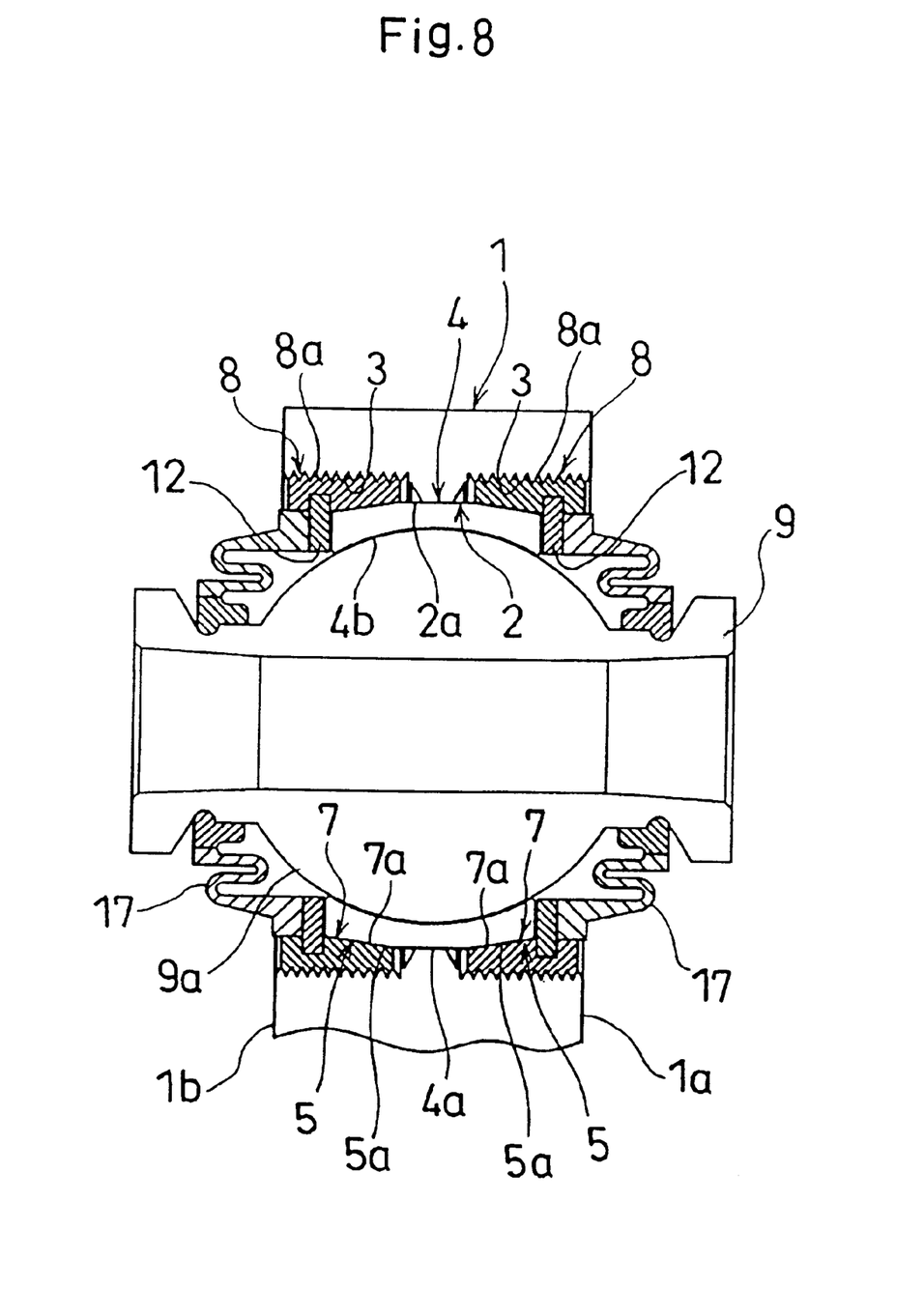
FIG. 8 is for explanation of another embodiment of the spherical bearing, showing a case where two stopping screws are used.

Further, as shown in FIG. 8, the screw portion 3 may be provided on both sides of the inner wall surface 2a of the race retention hole 2 and the outer conical portion 5 may be provided on both sides of the circumferential surface 4a of the outer race 4, and by screwing the stopping screw 8 into both screw portions 3, a pair of inner circumferential surfaces 7a of the inner conical portions 7 may be structured as to clamp both of the periphery surface 5a of the outer conical portions 5.

Figure 9:
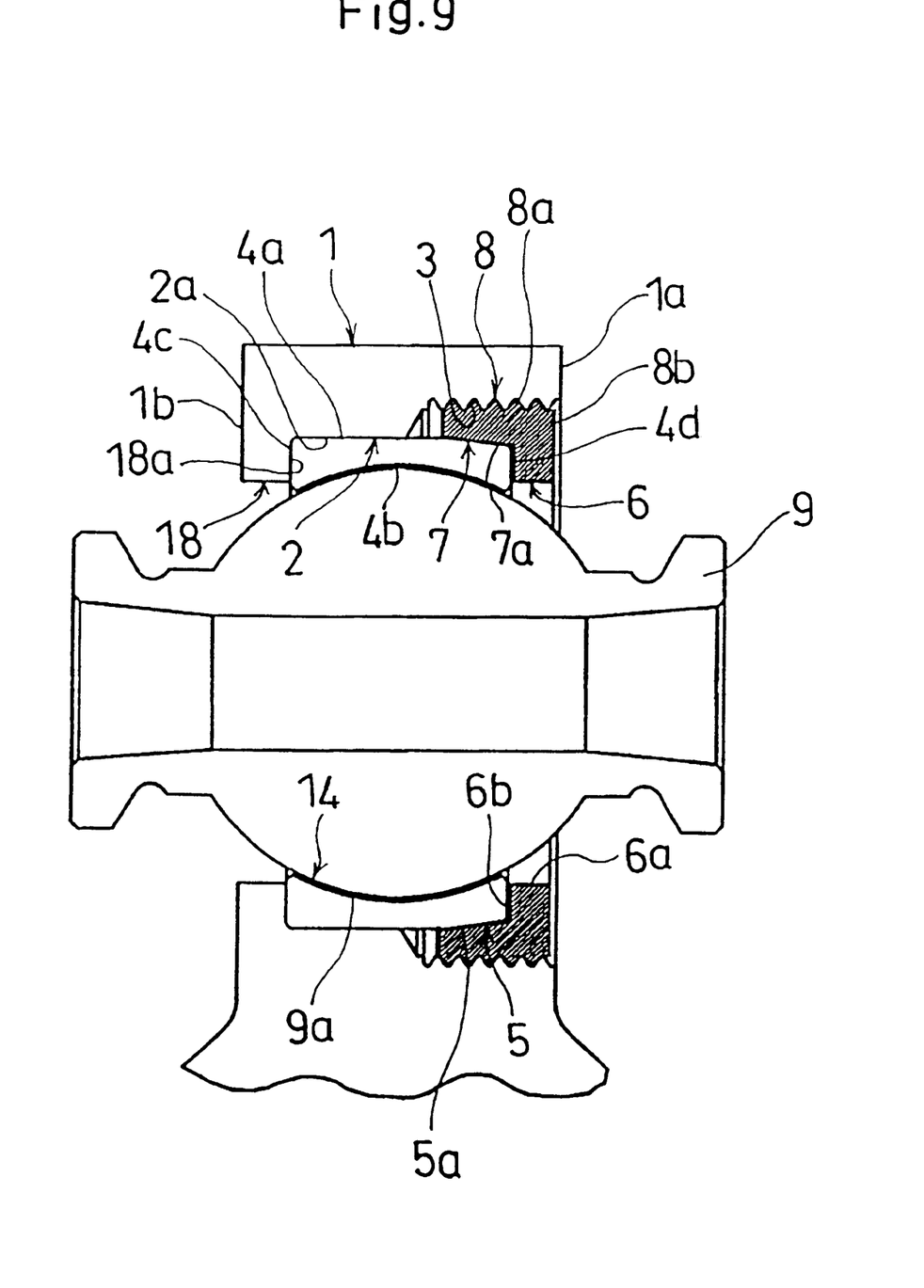
FIG. 9 is for explanation of other embodiment of the spherical bearing, showing the case where a snap ring is not used.

Further, as shown in FIG. 9, an inner diameter of the through hole 6 of the stopping screw 8 is formed smaller than the outer diameter of one side of the outer race 4, on the other side of the race retention hole 2, coaxially with the race retention hole 2, a hole 18 having an inner diameter smaller than the outer diameter of the outer race 4 is provided, thereby a clamping both end faces 4c and 4d of the outer race 4 may be carried out with the end face 18a at the stepped portion of the race retention hole 2 and the hole 18 and the end face 6b at the stepped portion of the through hole 6 and the inner conical portion 7.

For reference, the sign 17 in FIG. 1 shows a rubber boot for preventing dust from entering, and by molding, the snap rings 10 and 12 may be molded in a unitary manner.

In the above structure, the operation of the torque adjusting mechanism of the embodiment of the spherical bearing is explained. Hereinafter, the assembly in the spherical bearing of the embodiment and the adjusting process of the sliding torque at the time of assembling are explained.

(1) First, by pressing etc., the spherical surface 9a of the inner race 9 is retained with the inner circumference 4b of the outer race 4, and an assembly, which supports the spherical surface 9a of the inner race 9 at the inner circumference 4b of the outer race 4 rotatably and slidably, is formed.

(2) Next, the periphery surface 4a of the outer race 4 is retained to the inner circumference 2a of the race retention hole 2 in such a manner as the outer conical portion 5 of the outer race 4 opposes to the screw portion 3 of the retention hole 2. And, by inserting the outer race 4 up to a given position of the race retention hole 2, and the first snap ring 10 is retained with the annular groove 11 formed on the inner wall surface 2a. Thereby, the end face of the first snap ring 10 is adapted to be abutted against the end face 4c of the outer race 4.

Figure 7:
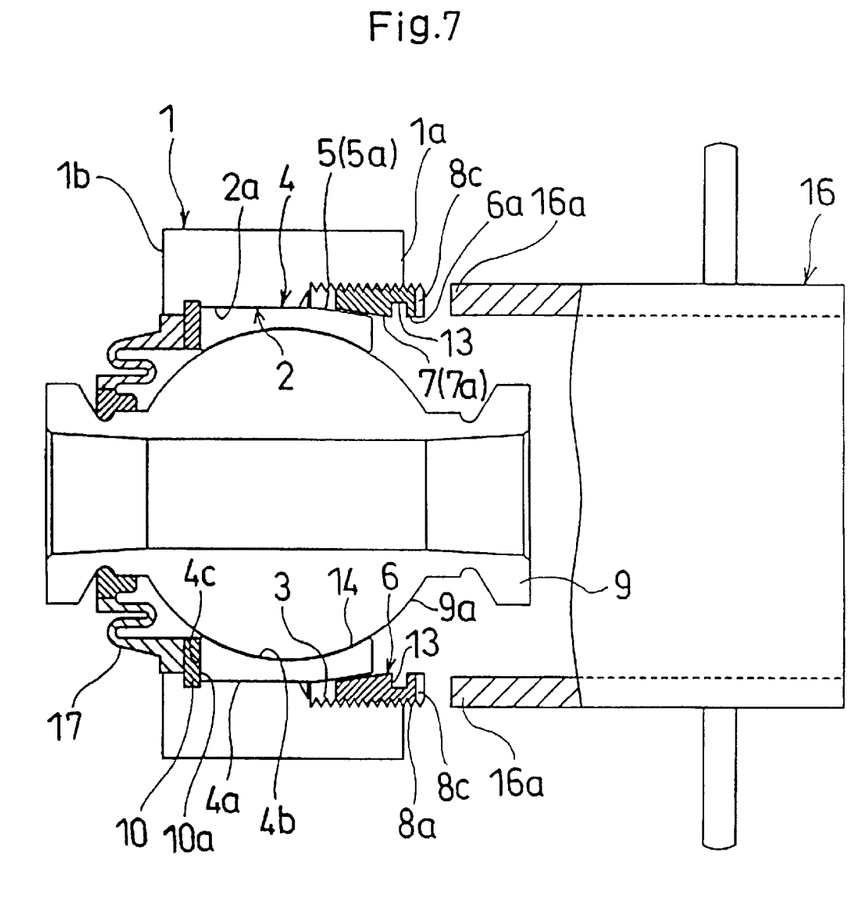
FIG. 7 is for explanation at the time of tightening the stopping screw of the embodiment.

(3) Next, as shown in FIG. 7, the stopping screw 8 is screwed with the screw portion 8 and by tightening the screw 8 with the exclusive tightening jig 16, the inner circumference 7a of the inner conical portion 7 is fit with the periphery surface 5a of the outer conical portion 5 and with the inner circumference 7a of the inner conical portion 7, the outer circumference 5a of the outer conical portion 5 is pressed and uniform pressure P (see FIG. 5) is made effected on the spherical surface 9a of the inner race 9 through the inner circumference 4b of the outer race 4. Further, by further tightening of the stopping screw 8, the contact surface pressure between the inner circumference 7a of the inner conical portion 7 and the periphery surface 5a of the outer conical portion 5 is increased, as a result, the pressure P (see FIG. 5) effected on the spherical surface 9a of the inner race 9 is increased to enable to increase the sliding torque of the spherical bearing. Accordingly, for example by using a torque measuring device and tightening the stopping screw 8 while confirming the sliding torque of the spherical bearing it is easy to obtain stably the spherical bearing having a given sliding torque.

(4) After regulating the sliding torque of the spherical bearing to a given value by tightening the stopping screw 8, with the annular groove 13 formed on the inner wall surface 6a of the through hole 6 of the stopping screw 8 the second snap ring 12 is retained. Here, as the second snap ring 12, a high tension snap ring is used, thereby as shown in FIG. 5, since, due to the provision of the force F in a radial direction of the through hole 6 to the bottom surface 13a of the annular groove 13, the contact surface pressure between the screw portion 3 of the race retention hole 2 and the screw 8a of the stopping screw 8 is increased, the stopping screw 8 is prevented from being loosened and the adjusted sliding torque can be kept. For reference, even if the spherical bearing, because, a gap is generated between the inner circumference 4b of the outer race 4 and the spherical surface 9a of the inner race 9 due to the wearing of the sliding liner 14, is adapted to be not able to obtain a given torque, by an additional tightening of the stopping screw 8, the contact surface pressure between the inner circumference 4b of the outer race 4 and the spherical surface 9a of the inner race 9 can be increased to restore the given sliding torque.

Accordingly, in the embodiment of the spherical bearing, one side of the race retention hole 2 is provided with the screw portion 3, and on one side of the periphery surface 4a of the outer race 4, the outer conical portion 5 is provided on one side of the periphery 4a of the outer race 4, and the periphery surface 4a of the outer race 4 supporting the spherical surface 9a of the inner race 9 rotatably and slidably is fit with the race retention hole 2. And, in the screw portion 3 formed in the race retention hole 2, the stopping screw 8 which has a through hole 6 in the axial direction and is provided with the inner conical portion 7 to be fit with the outer circumference 5a of the outer conical portion 5 and tightened, thereby the contact surface pressure between the inner circumference 4b of the outer race 4 and the spherical surface 9a of the inner race 9 is increased to increase the sliding torque. Thereby, by regulating the tightening force of the stopping screw 8, the sliding torque of the spherical bearing can be regulated.

Further, even in the case where due to the wearing of the sliding liner 14, a gap is generated between the inner circumference surface 4b of the outer race 4 and the spherical surface 9a of the inner race 9 and the sliding torque is reduced, by an additional tightening of the stopping screw 8, the surface contact pressure between the inner circumference surface 4b and the spherical surface 9a of the inner race 9 is increased and the sliding torque of the spherical bearing can be restored.

Further, by retaining the snap ring 12 into the annular groove 13 formed in the inner wall surface 6a of the through hole 6 of the stopping screw 8 and preventing the stopping screw 8 from being loosened, the regulated sliding torque of the spherical bearing can be kept.

According to the first aspect of the present invention, on one side of the race retention hole, the screw portion is formed, and one side of the periphery surface of the outer race, an outer conical portion is formed, and with the race retention hole, the periphery surface of the outer race supporting the spherical surface of the inner race rotatably and slidably is fit, and by screwing the stopping screw which has the through hole in the axial direction and on one side has the through hole of the inner conical portion, to be retained to the periphery surface of the outer conical portion is formed on the screw portion and tightening with the inner circumference of the inner conical portion the periphery surface of the outer conical portion is made to be pushed and the contact surface pressure between the inner circumference surface of the outer race and the spherical surface of the inner race is increased, and thereby the sliding torque of the spherical bearing is increased, so that by regulating the tightening force of the stopping screw, the sliding torque of the spherical bearing can be easily adjusted. Further, even in the spherical bearing in which, due to the wearing of the sliding liner, since between the inner circumference surface of the outer race and the spherical surface of the inner race a gap, is generated, the sliding torque is reduced, by an additional tightening of the stopping screw, the contact surface pressure between the inner circumference surface and the spherical surface of the inner race is increased to restore the sliding torque at the time of regulating.

Further, according to the second aspect of the present invention, the second snap ring is retained into the annual groove formed on the inner wall surface of the through hole of the stopping screw and by the second snap ring the bottom of the annular groove is pressed, thereby the stopping screw is expanded in the radial direction so that the contact surface pressure between the screw of the stopping screw and the screw portion of the inner wall face of the race retention hole is increased to prevent the stopping screw 8 from being loosened to keep the regulated sliding torque of the spherical bearing.

What is claimed is:

1. In a torque adjusting mechanism of a spherical bearing which is formed with an outer race and an inner race which spherical surface is rotatably supported on an inner circumference of the outer race, and formed by being retained into a race retention hole formed on the portion into which the spherical bearing is retained, the torque adjusting mechanism is characterized in that, on the portion into which the said spherical bearing is retained, a screw portion is provided on one side of the inner wall of the race retention hole with a given depth coaxially with the race retention hole, and on the other side of the race retention hole an annular groove into which a first snap ring is retained is formed, further, on one end of periphery of the outer race, an outer conical portion of a given tapered angle is provided and a stopping screw engaged with the screw portion, which has a through hole in the axial direction and opposes coaxially to the outer conical portion, and on one end of the through hole, an inner conical surface is provided.

2. A torque adjusting mechanism of a spherical bearing according to claim 1, wherein on the inner wall of the through hole of the stopping screw, an annular groove is formed into which a second snap ring is retained.

* * * * *